3,499,879
PROCESS FOR PREPARING POLYAMIDE
Hidehiko Kobayashi, Chihiro Oizumi, Takeshi Yamashita, and Shigemasa Okubo, Tokyo, Japan, assignors to Asahi Kasei Kogyo Kabushiki Kaisha, Osaka, Japan
No Drawing. Filed Oct. 10, 1966, Ser. No. 585,256
Claims priority, application Japan, Oct. 14, 1965, 40/62,689; Apr. 18, 1966, 41/24,140, 41/24,141
Int. Cl. C08f 3/74; C08g 20/02
U.S. Cl. 260—88.7                                   6 Claims

ABSTRACT OF THE DISCLOSURE

A process for preparing polyamide which comprises heating acrylonitrile or methacrylonitrile with water in a molar ratio ranging from 1:0.8 to 1:1.5 at a temperature of 100° C. to 250° C., preferably in the presence of a catalyst.

---

This invention relates to a process for preparing polyamide such as poly-$\beta$-alanine or poly-$\alpha$-methyl-$\beta$-alanine by reacting acrylonitrile or methacrylonitrile with water under suitable conditions.

As described in the specification of British Patent No. 736,461 and U.S. Patent No. 2,749,331 as well as in the Journal of American Chemical Society, 79, 3760 (1957), poly-$\beta$-alanine has been prepared by the hydrogen transfer polymerization of acrylamide using alkali alkoxide or other anionic catalyst systems, and it has been the most conventional method to obtain poly-$\beta$-alanine having relatively high molecular weight.

Although there are also some other processes for preparing poly-$\beta$-alanine known heretofore, for example, by heating ethylene cyanohydrin as described in the specifications of U.S. Patent Nos. 2,831,890 and 3,126,353, these processes can not give polymers having sufficiently high molecular weight to impart moldability, for example, fiber-forming capability.

We have found out that high molecular weight polyamide such as poly-$\beta$-alanine or poly-$\alpha$-methyl-$\beta$-alanine having a reduced viscosity of more than 1, said reduced viscosity being measured in 1% solution of polymer in formic acid at 35° C., may be prepared by heating acrylonitrile or methacrylonitrile and water under suitable conditions as described hereinafter.

Polyamide obtained according to the process of this invention may be formed into fibers, films and other useful shaped articles having excellent physical properties.

In accordance with the process of this invention, acrylonitrile is heated together with from 0.8 to 1.5 mols of water per mol of acrylonitrile in a closed vessel in the presence of an inert gas with or without stirring at a temperature of from 100° to 250° C. for an extended period of time to give eventually a white solid product consisting substantially of high-purity poly-$\beta$-alanine. In practising the process of this invention, it is particularly preferable that 1.00 to 1.03 mols of water may be allowed to react with one mol of acrylonitrile at a reaction temperature ranging from 150° to 200° C. The product obtained by reacting acrylonitrile with water in a closed vessel flushed with nitrogen under shaking or quiescence, using reaction conditions as mentioned above, has the same infrared absorption spectrum and an elementary analysis values as those of standard poly-$\beta$-alanine and it is soluble in any solvents such as formic acid, dichloroacetic acid, sulfuric acid and other solvents for standard poly-$\beta$-alanine, further, it has a reduced viscosity of about 0.1 to 0.2 as measured in 1% solution of polymer in formic acid at 35° C.

However, since the reduced viscosity of the product obtained according to the process of this invention using reaction conditions as described above is quite low as noted above, i.e. as low as about 0.1 to 0.2, it is rather difficult to obtain poly-$\beta$-alanine having a satisfactory moldability by using reaction conditions as described above alone.

It is, therefore, necessary to incorporate some additional reaction conditions to the process mentioned above in order to obtain poly-$\beta$-alanine having an increased reduced viscosity and a satisfactory moldability. One of these required additional reaction conditions is the use of a polymerization catalyst and the other is the use of additives in the polymerization reaction.

The use of catalyst in the polymerization reaction of the process of this invention contributes not only to the shortening of reaction period and the lowering of reaction temperature, but also to the increasing of both the purity and the reduced viscosity of the produced poly-$\beta$-alanine. For example, the use of 0.5 mol percent of zinc thiocyanate as a catalyst in the process of this invention not only enables the reduction in reaction period to one-fourth to one-fifth of that required in the reaction using no catalyst, but also the reduced viscosity of the product may be increased to about 0.4.

Although the degree of polymerization of such an extent as mentioned above, i.e. a reduced viscosity of about 4.0, is by no means sufficient to give shaped articles, yet, poly-$\beta$-alanine having such a degree of polymerization can be conveniently used as a starting material to produce acrylamide by the thermal decomposition thereof.

Catalysts which may be used in the process of this invention include metals of groups I–B, II–B, and VIII having fourth and fifth period in the Periodic Table and compounds thereof such as halides, oxides, sulfides, cyanides, thiocyanides, nitrates, sulfates, phosphates, carbonates, salts of organic acids, sulfonates. Furthermore various ammonium salts and amine salts of inorganic or organic acids are also useful as catalysts. Particularly, copper, zinc, cobalt and compounds thereof are most preferable. These catalysts as exemplified above may be used in the process of this invention in an amount of from 0.05 to 2.0 mol percent based on acrylonitrile used.

Further, in the process of this invention, the reduced viscosity of the product can be remarkably increased by the use of additives in conjunction with said catalysts. Effective additives include various surfactants, intermediate products formed in the reaction of acrylonitrile with water, and other water soluble polymers. Surfactants which may be used in the process of this invention as additives include general emulsifying dispersing agents and wetting agents, such as, for example, alkylbenzenesulfonates, polyethers, quarternary ammonium salts and the like. The use of these surfactants in an amount less than 10% by weight based on the weight of acrylonitrile usually suffices to give a satisfactory result.

Intermediate products produced in the reaction of acrylonitrile with water contain, in addition to low molecular weight poly-$\beta$-alanine, small amounts of ethylenecyanohydrin, bis-cyanoethylether, acrylamide, and extremely small quantities of acrylonitrile polymer and derivatives thereof. It is most convenient and effective in increasing the reduced viscosity of poly-$\beta$-alanine to charge these intermediate products to the polymerization reaction system of acrylonitrile and water as additives in the form of a mixture without isolating them with each other. In this instance, a preferable amount of intermedate product charged to the polymerization reaction system is from 1 to 80% by weight based on the total weight of acrylonitrile, water and additives, that is, the sum of acrylonitrile and water, originally present, is from 20 to 99% based on the total weight of acrylonitrile, water and additives. For instance, there is added to acrylonitrile an equimolar amount of water and further 0.2 mol percent of metallic copper powder based on acrylonitrile, and the resulting mixture is heated in a closed vessel flushed with nitrogen at a temperature of 180° C. for about 10 hours to give an intermediate product in the reaction of acrylonitrile and water which is a homogeneous liquid without layer separation even at room temperature. One part by weight of the intermediate product is added to about 2 parts by weight of a mixture consisting of equimolar amounts of acrylonitrile and water and the resulting mixture is heated in the presence or absence of 0.2 mol percent of metallic copper powder at 180° C. in nitrogen for about 40 hours to give a white solid product quantitatively. The product consists substantially of poly-$\beta$-alanine and it affords a high-purity poly-$\beta$-alanine with a purification treatment, for example, removal of methanol soluble matter by extraction. If the polymerization reaction is carried out in this manner, it is possible to increase the reduced viscosity of the poly-$\beta$-alanine to more than 1, which is as high as that of poly-$\beta$-alanine obtained according to the conventional processes known heretofore. As noted above, with regard to the physical properties of the product obtained in the process of this invention, e.g. an infrared absorption spectrum at 600–4000 cm.$^{-1}$, elementary analysis value and solubility in solvents, the product obtained according to the process of this invention shows exactly the identical behaviors with those of standard poly-$\beta$-alanine. Furthermore, X-ray patterns of the product thus obtained reveals that it has higher crystallinity than that of poly-$\beta$-alanine obtained in prior art processes.

Briefly stated, the polymerization process of this invention comprises charging acrylonitrile or methacrylonitrile and water, adding catalyst and/or additive if desired, and heating these ingredients in a closed vessel at an ambient temperature and under atmospheric pressure in the presence of an inert gas. However, in actual practice, some factors such as pressurizing, shaking, stirring and the like, mode of adding water, the use of organic medium and the like appreciably affect the polymerization reaction.

Since acrylonitrile and water form a homogeneous mixture at reaction temperatures of from 100° to 250° C., shaking or stirring is not necessarily an essential requisite, however, shaking or stirring is desirable in order to prevent local overheating and to facilitate uniform heating of the reaction mixture.

In the process of this invention, although the reaction pressure in the closed vessel is maintained at about 15 atmospheres due to vaporizing pressures of acrylonitrile and water contained therein, further pressurization up to about 30 atmospheres by inert gas is desirable.

As to the mode of adding water in the process of this invention, it is convenient to carry out the reaction by adding an equimolar amount of water to acrylonitrile, however, it is also possible to charge water continuously thereto. For instance, it is possible to first add 0.5 mol of water per mol of acrylonitrile and to pressurize the remaining 0.5 mol of water in the form of steam under a predetermined pressure continuously to the reaction system as the reaction proceeds. Adversely, it is also possible to pressurize the required amount of acrylonitrile in the same manner as described above into the reaction system in which 1.2 mol of water has been charged per mol of acrylonitrile beforehand.

Polymerization reaction system as described above illustrates the reaction using no organic medium in which the reaction product is obtained as a solid mass, therefore, the subsequent operations are made considerably difficult. In order to overcome this problem, the use of an organic medium is preferable. Thus, by carrying out the polymerization reaction in organic medium, the produced poly-$\beta$-alanine may be obtained in the powdered or granular form as a suspension in organic medium. Organic media which may be used in the process of this invention for such purpose as mentioned above include, for example, hydrocarbons such as benzene, toluene, xylene, ethylbenzene, solvent naphtha, n-hexane, cyclohexane, ligroin, petroleum benzine, petroleum ether and the like; aromatic halogenated compounds such as chlorobenzene, dichlorobenzene and the like; various tertiary amines such as triethylamine, tributylamine, dimethylaniline and the like; and ethers such as dioxane, tetrahydrofuran and the like. Among these organic media as exemplified above, hydrocarbons are most preferably used from the viewpoint of cost and quality of the produced polymer, and these organic media are used in such an amount that the concentration of suspended polymer is not exceeding 50%. Also, upon using these organic media, it is necessary to select a proper type of surfactant from the group as mentioned above.

In the process of this invention, although these organic media may be present at the time of the initiation of polymerizationn reaction, it is more effective in increasing the degree of polymerization to charge said media to the reaction system to dilute the polymerization product when the reaction mass becomes high viscous as the polymerization proceeds. By effecting the polymerization reaction in organic medium as described, the poly-$\beta$-alanine is obtained in the form of suspension, thus subsequent operations are made quite easy and this gives a great advantage from an industrial point of view.

While in the foregoings, a process for preparing poly-$\beta$-alanine from acrylonitrile and water has been described, exactly the same reaction as illustrated above may be applied to other $\alpha$-$\beta$ unsaturated nitriles. For example, under the same reaction condition as described above, methacrylonitrile produces corresponding polyamide poly-$\alpha$-methyl-$\beta$-alanine, and cronton nitrile produces poly-$\beta$-methyl-$\beta$-alanine or polycrotonamide, respectively.

In accordance with this invention, polyamide having a high purity and viscosity equal to or exceeding that of polyamide produced by prior art processes can now be prepared from acrylonitrile or methacrylonitrile and water at low cost. Polyamide obtained according to the process of this invention may be formed into shaped articles having excellent physical properties, for example, a fiber having outstandingly superior physical properties, thus, this invention has a great industrial value.

The following examples will serve to illustrate this invention more practically, however, it should not be construde that these examples restrict this invention as they are given merely by way of illustration.

In the following examples, parts and percentages referred to therein are wholly expressed in "by weight," and the reduced viscosities are measured in 1% solution of polymer in formic acid at 35° C.

EXAMPLE 1

1.6 parts by weight of acrylonitrile and an equimolar amount of water were charged to an autoclave flushed with nitrogen and heated at 250° C. with shaking. After the reaction was carried out for 50 hours, the shaking was terminated, and the mixture was further heated for another 20 hours so as to make a total heating period of 70 hours. At the end of the period, the reaction mixture was cooled to give 2.1 parts by weight of yellowish solid. The product thus obtained showed an infrared absorption spectrum almost identical with that of poly-$\beta$-alanine. The product was extracted with hot methanol to remove solubles thus affording 1.8 parts by weight of white powder which showed an infrared absorption spectrum exactly identical with that of poly-$\beta$-alanine within the range of 4000 cm.$^{-1}$ to 500 cm.$^{-1}$ and a reduced viscosity of 0.11.

Value of an elementary analysis of the product were:
Calculated for poly-$\beta$-alanine $(C_3H_5ON)_n$: C, 50.69%; H, 7.09%; N, 19.71%. Found: C, 50.77%; H, 7.29%; N, 19.55%.

EXAMPLE 2

The experiment of Example 1 was repeated according to the same procedures as described therein except that the amount of water was changed to 0.8 mol and 1.5 mols per mol of acrylonitrile, respectively. The results are given in the following table:

| | Amount of water charged | |
|---|---|---|
| | 0.8 mol | 1.5 mols |
| Produced polymer | 2.1 parts (yellowish brown). | 2.1 parts (white). |
| Methanol extraction residue | 0.9 part (light yellowish brown). | 1.5 parts (white). |
| Reduced viscosity, $\eta_{sp/c}$ | 5.06 | 0.04. |
| Infrared absorption as compared with poly-β-alanine. | Identical | Identical |

EXAMPLE 3

A mixture containing 3.208 parts by weight of acrylonitrile, 1.104 parts by weight of water and 0.02 part by weight of $Zn(SCN)_2$ was charged to an autoclave flushed with nitrogen and heated at 150° C. for about 20 days with shaking. As a result, 3.3 parts by weight of white solid reaction product was obtained. The product was granulated and extracted with hot methanol to give 1.3 parts by weight of insoluble matter which showed a reduced viscosity of 0.10 and an infrared absorption spectrum identical with that of poly-β-alanine.

EXAMPLE 4

To a mixture consisting of 1.606 parts by weight of acrylonitrile and 0.551 part by weight of water was added 0.01 part by weight of zinc thiocyanate, and the resulting reaction mixture was charged to a glass ampoule flushed with nitrogen which was then sealed and heated at 176° C. for 13 hours in an oil bath with shaking to give a homogeneous liquid which was not separated into two layers even at a room temperature. In the subsequent experiment, said homogeneous liquid obtained in the above was used as an addition. That is, 3.218 parts by weight of acrylonitrile and 1.104 parts by weight of water was added to the additive in the ampoule mentioned above and after it was flushed with nitrogen, the reaction was further carried out at 176° C. for about 40 hours and the reaction mixture turned to a homogeneously high viscous liquid. At this point, the shaking was terminated and heating was continued for another 10 hours to give 6.4 parts by weight of a hard solid of pale yellowish colour. The product was granulated and extracted with hot methanol and 5.1 parts by weight of insoluble was obtained in the form of white powder.

The resulting product was soluble in formic acid, dichloroacetic acid and sulfuric acid and was insoluble in dimethylformamide and was found to show an infrared absorption spectrum exactly identical with that of standard poly-β-alanine within the range of 4000 cm.$^{-1}$ to 500 cm.$^{-1}$ and a reduced viscosity of 1.06.

Furthermore, values of an elementary analysis of the product were found as:

C, 51.00%; H, 7.25%; N, 19.61% which are very close to the calculated values.

X-ray examination revealed a sharper reflection than standard poly-β-alanine at $2\theta = 21.8, 23.3°$.

EXAMPLE 5

The experiment of Example 4 was repeated according to the same procedures as described therein except that various catalysts as specified in the following table were substituted for zinc thiocyanate. The amounts of catalysts used were 0.13 mol percent based on the total of acrylonitrile, respectively, in all cases. The results are as follows:

| Catalyst | Reaction period to give solid product (hrs.) | $CH_3OH$ extraction residue (percent) | Reduced viscosity, $\eta_{sp/c}$ |
|---|---|---|---|
| Zn | 100 | 75 | 0.68 |
| Cu | 100 | 78 | 0.73 |
| $CoCl_2$ | 150 | 85 | 0.81 |
| $Cu_2Cl_2$ | 90 | 80 | 0.78 |
| $Cu_2(SCN)_2$ | 80 | 83 | 0.96 |
| $(NH_4)_2SO_4$ | 120 | 78 | 0.61 |
| $ZnSO_4$ | --- | 76 | 0.51 |
| $Ag_2SO_4$ | 260 | 60 | 0.43 |
| $Ag_2O$ | 190 | 65 | 0.43 |
| ZnO | 300 | 78 | 0.70 |
| CdS | 300 | 65 | 0.51 |
| $ZnCO_3$ | 300 | 71 | 0.69 |
| $Zn(NO_3)_2$ | 100 | 71 | 0.46 |
| $(CH_3COO)_2Zn$ | 150 | 79 | 0.70 |
| $Cu_2(CN)_2$ | 100 | 80 | 0.68 |
| None | About 480 | 75 | 0.40 |

EXAMPLE 6

To a mixture consisting of 3.218 parts by weight of acrylonitrile and 1.104 parts by weight of water was added 0.3 part by weight of Emalgen 120 (polyoxyethylene lauryl ether—surfactant), 0.2 mol percent of $CoCl_2$ and 30 mol of toluene per mol of crylonitrile and the reaction mixture was heated at 180° C. for 100 hours in nitrogen with stirring.

The produced polymer was obtained as an emulsion dispersed in toluene which, by filtration and extraction with methanol, afforded 3.3 parts by weight of polymer.

The polymer showed a reduced viscosity of 0.86 and the product was completely identical with the standard poly-β-alanine in regard of an infrared absorption spectrum, elementary analysis, solvent behavior, etc.

The same results as in the above were obtained with the use of Pelex NB (sodium alkylnaphthalenesulfonate) and Quartamine 24 (quaternary ammonium salt type) as the surfactant.

EXAMPLE 7

A mixture consisting of 6.7 parts by weight of methacrylonitrile and 1.8 parts by weight of water was heated at 200° C. for 100 hours under pressurized nitrogen of 30 atmospheres in an autoclave with shaking. As a result, 8.4 parts by weight of yellowish brown solid was obtained and it was extracted with hot methanol to afford 5.5 parts by weight of insoluble matter which was confirmed to be polyamide by an infrared absorption spectrum and it had a reduced viscosity of 0.09.

What we claim is:

1. A process for preparing a solid poly-beta-alanine which comprises heating a member selected from the group consisting of acrylonitrile and methacrylonitrile with water in a molar ratio ranging from 1:0.8 to 1:1.5 at a temperature of from 100° C. to 250° C. for a period of time sufficient to produce a solid poly-beta-alanine, and recovering the solid poly-beta-alanine, said heat treatment being effected in the presence of at least one catalyst selected from the group consisting of (1) metals of Groups I–B, II–B and VIII having fourth and fifth period in the Periodic Table, (2) compounds of said metals selected from the group consisting of halides, oxides, sulfides, cyanides, thiocyanides, nitrates, sulfates, phosphates, carbonates, salts of organic acids and sulfonates, (3) ammonium and amine salts of inorganic acids, and (4) ammonium and amine salts of organic acids, said catalyst being employed in an amount of from 0.05 to 2.0 mols per mol of said nitrile.

2. A process according to claim 1, wherein said heat treatment is effected in the presence of an additive selected from the group consisting of polyalkylene ethers, alkyl aromatic sulfonates and quaternary ammonium salts, the amount of said additive being less than 10% by weight based on the weight of said nitrile used, and an organic solvent which is inert to said nitrile and water and is selected from the group consisting of hydrocarbons, aromatic halogenated hydrocarbons and ethers.

3. A process according to claim 1, wherein said heat-treatment is effected in the presence of an additive selected from the group consisting of polyalkylene ethers, alkyl aromatic sulfonates and quaternary ammonium salts, the amount of said additive being less than 10% by weight based on the weight of said nitrile used.

4. A process according to claim 1, wherein said heat-treatment is effected in the presence of an organic medium which is inert to said nitrile and water, selected from the group consisting of hydrocarbons, aromatic halogenated hydrocarbons and ethers.

5. A process for preparing a solid poly-beta-alanine comprising the steps of
   (1) reacting a nitrile selected from the group consisting of acrylonitrile and methacrylonitrile with water in a molar ratio ranging from 1:0.8 to 1:1.5 at a temperature of 100° C. to 250° C. for a period of time sufficient to produce a homogeneous liquid poly-beta-alanine polymer, the heat treatment being effected in the presence of at least one catalyst selected from the group consisting of (1) metals of Groups I–B, II–B and VIII having fourth and fifth period in the Periodic Table, (2) compounds of said metals selected from the group consisting of halides, oxides, sulfides, cyanides, thiocyanides, nitrates, sulfates, phosphates, carbonates, salts of organic acids and sulfonates, (3) ammonium and amine salts of inorganic acids, and (4) ammonium and amine salts of organic acids, said catalyst being employed in an amount of from 0.05 to 2.0 mols per mol of said nitrile,
   (2) forming a mixture by adding additional amounts of water and of said nitrile used in step (1) to the liquid poly-beta-alanine produced in step (1), the amount of said liquid poly-beta-alanine being from 1 to 80 percent by weight based on the total weight of said additional amounts of nitrile, water, and said liquid poly-beta-alanine, the sum weight of said additional amounts of said nitrile and water being from 20 to 99 percent by weight based on the total weight of said additional amounts of nitrile, water and said liquid poly-beta-alanine, and
   (3) reacting the components of the mixture formed in step (2) at a temperature of from 100° C. to 250° C. for a period of time sufficient to produce a solid poly-beta-alanine.

6. A process according to claim 5, wherein step (3) is carried out in the presence of an organic solvent which is inert to said nitrile and water and is selected from the group consisting of hydrocarbons, aromatic halogenated hydrocarbons and ethers.

References Cited

UNITED STATES PATENTS

| | | | |
|---|---|---|---|
| 3,200,102 | 8/1965 | Kleiner | 260—88.7 |
| 3,280,086 | 10/1966 | Nakajima et al. | 260—88.7 |
| 3,312,679 | 4/1967 | Crano | 260—88.7 |
| 3,356,644 | 12/1967 | Lee | 260—88.7 |

HARRY WONG, JR., Primary Examiner

U.S. Cl. X.R.

260—78, 30.8, 31.2, 561